Figure 1:
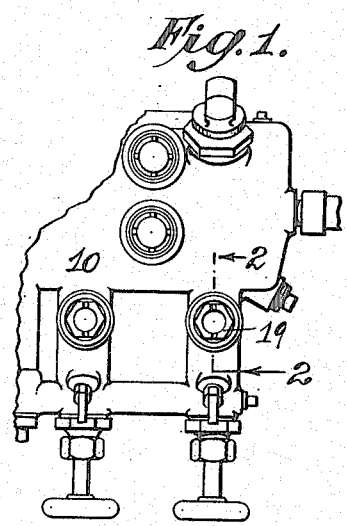

E. A. KELSEY.
SIGHT GLASS.
APPLICATION FILED APR. 21, 1914.

1,129,988.

Patented Mar. 2, 1915.

Attest:
Alda L. Miller
Mary H. Lewis

Edgar A. Kelsey, Inventor:
by William R. Baird
his Atty

UNITED STATES PATENT OFFICE.

EDGAR A. KELSEY, OF MOUNT VERNON, NEW YORK, ASSIGNOR TO NATHAN MANUFACTURING COMPANY, OF NEW YORK, N. Y., A CORPORATION OF NEW YORK.

SIGHT-GLASS.

1,129,988.     Specification of Letters Patent.     Patented Mar. 2, 1915.

Application filed April 21, 1914. Serial No. 833,384.

*To all whom it may concern:*

Be it known that I, EDGAR A. KELSEY, a citizen of the United States, residing at Mount Vernon, in the county of Westchester and State of New York, have invented certain new and useful Improvements in Sight-Glasses, of which the following is a specification.

This invention relates to a sighting device for a sight feed lubricator or similar apparatus provided with apertures through which the condition of the interior of such apparatus is to be perceived, and its novelty consists in the construction and adaptation of the parts as will be more fully hereinafter pointed out.

Concerning devices of this general character, the art has advanced to a point where a sight glass comprising usually a tubular body with a cylindrical annular flange is confined within a casing projecting from the frame or body of the apparatus, the interior of which is to be observed, and which glass is secured in place by any suitable means and provided with a packing interposed between its outer surface and the interior of the casing to prevent leaking from the interior of the device around the sight glass.

In practice, it has been found difficult to remove a glass of this character from its casing after it has been in position any length of time, because the parts have been made with a tight fit and the packing under the influence of heat, pressure and the presence of oily vapors, tends to become disintegrated and to spread to the space between adjacent parts and to cement the glass in position. In such construction it is also necessary to use a packing especially adapted to fit within the casing and around the body of the glass.

The purpose of my invention is to obviate the difficulties and overcome the disadvantages inherent in the form of device above described, and to that end it consists briefly in the provision within the casing of a beveled seat against which there is adapted to be pressed a sight glass of peculiar form, comprising a truncated spherical body, with one or two cylindrical extensions, a packing interposed between the spherical portion of the body and the interior of the casing, and a follower threaded into the casing and adapted to impinge against the packing, the glass itself loosely fitting within the casing and the follower so that when the follower is withdrawn, the glass is adapted either to fall out by gravity or to readily be removed. And in order specifically to secure a proper seat for the spherical portion of the glass, such seat is made to terminate within the circumscribing cylinder of the spherical portion of the glass.

Figure 2:
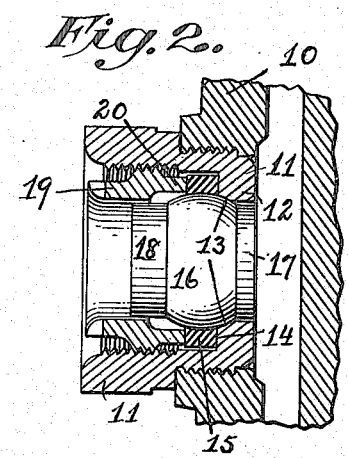
Figure 3:
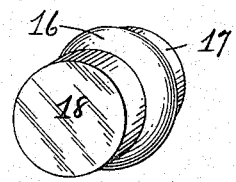
Figure 4:
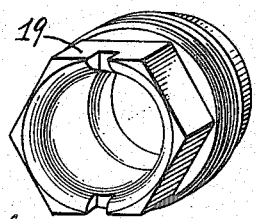

In the drawings, Figure 1 is an end elevation of a portion of an apparatus such as a sigh feed lubricator provided with a casing and sight glass embodying a preferred form of the invention; Fig. 2 is a transverse vertical section on the plane of the line 2—2 in Fig. 1; Fig. 3 is a perspective of the sight glass; and Fig. 4 is a perspective of the follower.

In the drawings, 10 is the body or frame of the device to be provided with the sighting elements. It is suitably apertured and the periphery of such apertures is preferably internally threaded to receive the casing indicated at 11, and which is externally threaded at its inner end to fit within such aperture. The casing is of usual tubular form and is provided with an inturned annular flange 12 which is beveled at 13 to form a seat for the rounded surface of the sight glass as will presently be described. The annular flange forms a second seat at 14 adapted to be engaged by a packing 15 resting against the same.

Arranged within the casing is the sight glass comprising a central body 16 made up of a truncated sphere and which body is provided with a cylindrical extension 17 on one side and a second cylindrical extension 18 on the other side.

19 is a follower externally threaded to engage the internal threads of the casing and provided with an inwardly projecting annular flange adapted to press against the packing 15. The glass comprising the rounded body and cylindrical projections is made so as loosely to fit within the casing and the follower so that when the follower is withdrawn it will either fall out by gravity or it can be readily removed without effort. The beveled seat 13 of the casing is preferably made so that its outermost edge is within the limits of the circumscribing cylinder of the spherical portion of the glass. This arrangement is for the purpose of preventing the creeping of the packing toward the outside of the casing.

What I claim is:

In a device of the character described consisting of two tubular bodies one having a greater diameter than the other the smaller arranged to fit wholly within the larger, an inturned annular flange formed on the inner end of the larger body and constituting a seat, a beveled seat provided on the inner edge of said flange, a sight glass arranged to fit against said beveled portion, and a packing ring adapted to lie against the flange and between said glass and the inner side of the larger body and against the inner end of the smaller body.

In testimony whereof I affix my signature in presence of two witnesses.

EDGAR A. KELSEY.

Witnesses:
 LEOPOLD KASSANDEY,
 ALBERT W. MORSE.

Copies of this patent may be obtained for five cents each, by addressing the "Commissioner of Patents, Washington, D. C."